United States Patent [19]

Vanderlaan et al.

[11] Patent Number: 4,510,403
[45] Date of Patent: Apr. 9, 1985

[54] LIMITED ANGLE TORQUE MOTOR WITH MAGNETIC CENTERING AND STOPS

[75] Inventors: Robert D. Vanderlaan; Richard Grau, both of Kalamazoo, Mich.

[73] Assignee: Pneumo Corporation, Boston, Mass.

[21] Appl. No.: 579,784

[22] Filed: Feb. 13, 1984

[51] Int. Cl.³ ............................................. H02K 33/00
[52] U.S. Cl. ..................................................... 310/36
[58] Field of Search ................................... 310/36–38, 310/156, 194; 335/229, 230, 272, 276

[56] References Cited

U.S. PATENT DOCUMENTS

| | | | |
|---|---|---|---|
| 3,234,436 | 2/1966 | Bieger | 310/36 X |
| 3,483,410 | 12/1969 | Siegelman et al. | 310/36 X |
| 4,090,112 | 5/1978 | Selverstone | 310/36 X |
| 4,227,164 | 10/1980 | Kitahara | 310/36 X |
| 4,287,457 | 9/1981 | Takemura | 310/36 X |

Primary Examiner—Mark O. Budd
Attorney, Agent, or Firm—Maky, Renner, Otto & Boisselle

[57] ABSTRACT

A 2-pole limited angle torque motor including a rotor assembly having one or more permanent magnets which are magnetized in the diametrical direction and a stator assembly having a pair of stator magnetic pole blades surrounded by a high density layer wound stator coil, with stator pole flanges at opposite ends of the stator magnetic pole blades which create a cross flux through the stator and rotor assemblies that produces a limited angle turning torque in the motor. The permanent rotor magnets along with stator magnetic poles and magnetic housing produce a magnetic reluctance torque that can be controlled to obtain a desired magnetic centering or de-centering spring rate for the rotor at a particular torque or power level. A magnetically saturating flux path may also be made to occur in the motor at the end of the rotational design stroke of the motor to provide a magnetic stop for the rotor shaft.

30 Claims, 12 Drawing Figures

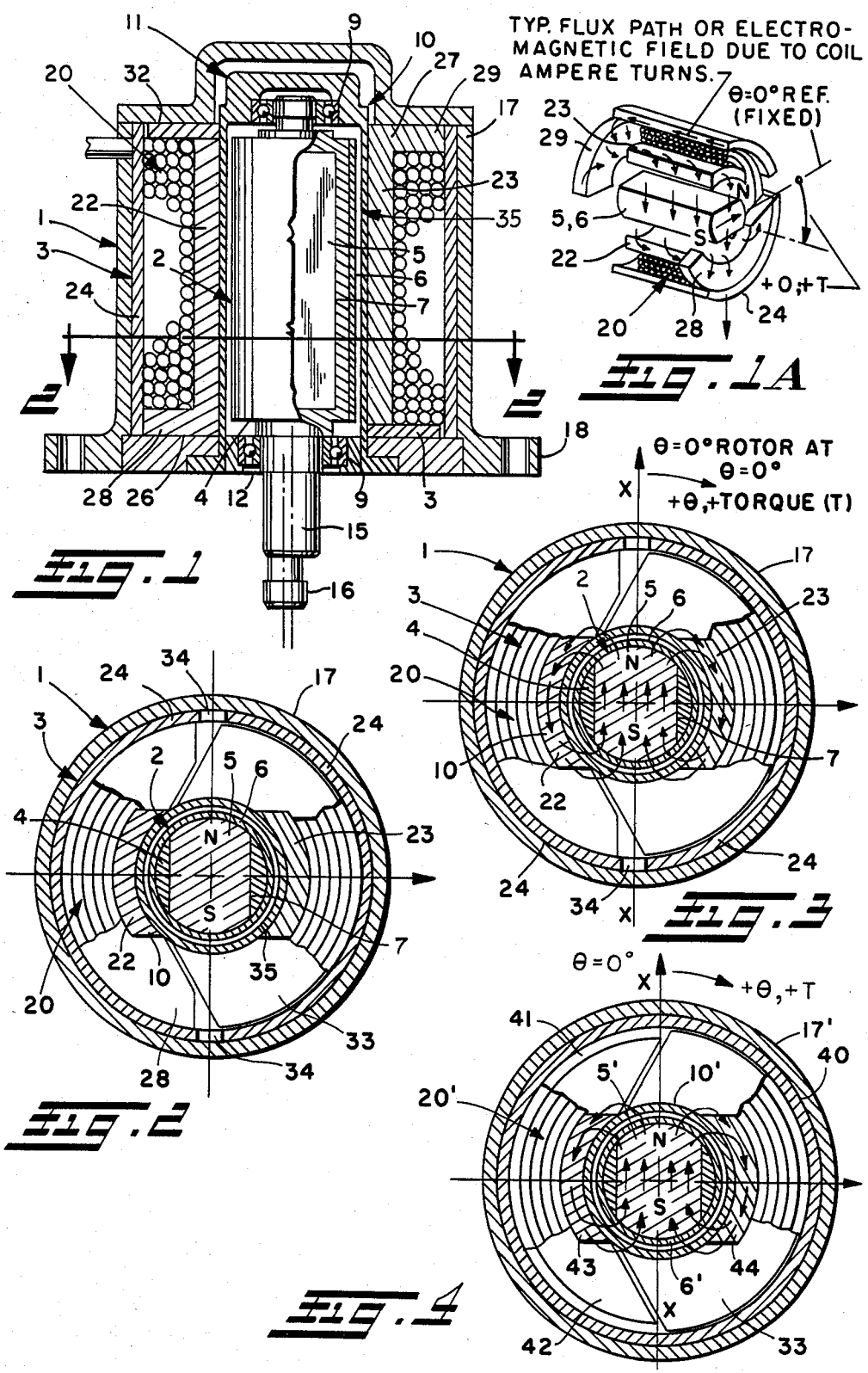

LIMITED ANGLE TORQUE MOTOR WITH MAGNETIC CENTERING AND STOPS

This invention relates generally as indicated to a limited angle of rotation torque motor with magnetic centering and stops.

BACKGROUND OF THE INVENTION

The limited angle torque motor of the present invention is particularly suited for use in certain types of high pressure fluid proportional servo control systems including, but not limited to, aircraft controls to drive a proportional control valve of relatively short stroke. The fluid pressure is normally on the order of 1,000 psi or more.

In such a motor, it would be desirable to provide for increased output torque efficiency, improved producibility, and increased reliability. Also, it would be advantageous to provide for magnetic centering of the rotor shaft as well as magnetic stops to control the maximum rotational stroke of the rotor shaft. Another desirable feature would be to provide for electrical redundancy without altering the maximum rotational stroke of the motor.

SUMMARY OF THE INVENTION

In accordance with one aspect of the invention, the motor is a 2-pole limited angle torque motor including a rotor assembly having one or more permanent magnets which are magnetized in the diametrical direction and a stator assembly having a pair of stator magnetic pole blades surrounded by a circumferentially wound stator coil, with stator magnetic pole flanges at opposite ends of the stator magnetic pole blades which cause a cross flux through the stator and rotor assemblies when a direct or pulse width modulated current is applied to the stator coil to produce a limited rotational angle range for the rotor assembly. The magnetic reluctance torque of the motor is controlled to provide a strong centering tendency of the rotor assembly at the midpoint of such rotational angle range.

In accordance with another aspect of the invention, the stator coil is a high density layer wound coil to increase the output torque efficiency of the motor.

Further in accordance with the invention, the magnetic reluctance torque of the motor is controlled to obtain a particular desired magnetic centering or de-centering spring rate at a particular torque or power level.

In accordance with another aspect of the invention, a magnetically saturating flux path may be made to occur in the magnetic stator structure at the end of the rotational design stroke of the rotor shaft to provide a magnetic stop for the rotor shaft.

Still further in accordance with the invention, multiple coil windings may be provided in the stator assembly for obtaining electrical redundancy without altering the maximum rotational stroke of the rotor shaft.

Also in accordance with the invention, the motor may be provided with a stator assembly which is simple to manufacture and suitable for high density layer winding.

In accordance with still another aspect of the invention, the stator assembly may be easily multiplexed and easily insulated from structure and from adjacent coils.

To the accomplishment of the foregoing and related ends, the invention then, comprises the features herein after fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a fragmentary longitudinal section through one form of limited angle torque motor in accordance with the present invention;

FIG. 1a is a schematic diagram illustrating the typical flux path or electro-magnetic field within the motor of FIG. 1 due to coil ampere turns;

FIG. 2 is a transverse section through the motor of FIG. 1 showing the outer magnetic housing of the stator assembly as having one or more air gaps therein to provide a partially interrupted return path for the magnetic field;

FIG. 3 is a transverse section similar to FIG. 2 but showing the magnetic flux path for the permanent rotor magnets developing a magnetic reluctance torque tending to maintain the rotor shaft in a centered or null position at $\theta=0°$;

FIG. 4 is a transverse section through a modified form of limited angle torque motor in which the outer magnetic housing is completely cylindrical and an air gap is provided between the outer cylindrical housing and one or both stator magnetic poles;

DETAILED DESCRIPTION OF THE PREFERRED EMBODIMENTS

Figure 5:
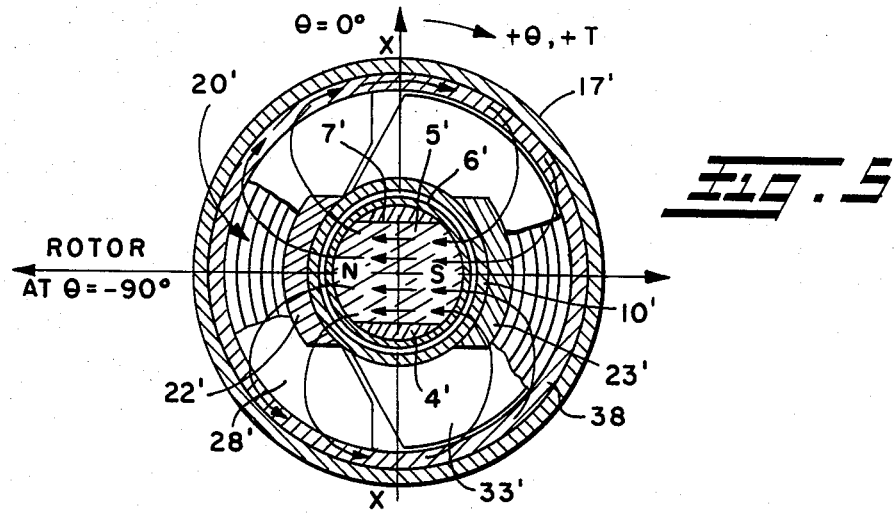
FIG. 5 is a transverse section through still another form of limited angle torque motor in accordance with this invention in which there is no air gap between the outer magnetic housing and magnetic stator poles of the stator assembly and showing the different magnetic flux path produced by the permanent rotor magnets which develops a magnetic reluctance torque tending to move the rotor shaft to a de-centered position which is $-90°$ from that shown in FIGS. 3 and 4.

Referring now in detail to the drawings, and initially to FIGS. 1 and 2 thereof, one form of limited angle torque motor in accordance with this invention is generally indicated by the reference numeral 1. Such torque motor is primarily intended for use in high pressure fluid systems for directly driving a valve in proportional servo control systems including, but not limited to, aircraft controls. However, it should be understood that such motor could also be used for driving secondary valves as well as other mechanical devices.

Preferably, the motor is a non-commutated two pole stationary coil rotary magnet motor generally of the type disclosed in copending applications Ser. Nos. 482,769 and 489,237, filed Apr. 7, 1983, and Apr. 28, 1983, respectively. As with the motor designs of such copending applications, the motor of the present invention desirably consists of two main assemblies, a rotor assembly 2 and a stator assembly 3. The rotor assembly includes a rotor shaft 4 having one or more permanent magnets 5 intermediate the ends thereof. Preferably the rotor shaft is a one piece construction with a transverse slot 7 machined therein for receipt of the magnets as shown in FIG. 1 to provide a maximum magnet cross section with a firm support structure. The magnets are magnetized in the diametrical direction, that is, the north and south poles N and S of the magnets are diametrically oriented as shown. Preferably, such magnets are rare earth magnets and are desirably contained within a protective cover or sleeve 6 which may be slipped over the shaft 4 and magnet 5 assembly after the assembly has been ground into a solid cylindrical shape to prevent potential rotor magnet breakage contamination. The magnets 5 and cover 6 are held in place by a suitable adhesive.

If the motor is used to drive a servo valve, the rotor assembly 2 is desirably journal mounted in suitable bearings 9 within a rotor casing 10 which may be closed at one end 11 and open at the other end 12 as shown in FIG. 1 to permit hydraulic fluid to enter the rotor casing through the open end thereof. This allows the rotor assembly to operate in the fluid while at the same time isolating the rotor assembly from the contaminated atmosphere of the stator environment. The rotor shaft 4 has a drive shaft 15 extending outwardly beyond the rotor casing. On the outer end of the output shaft 15 may be an eccentric or other suitable form of rotary to linear gearing 16 that preferably translates the rotary movement of the rotor shaft to linear movement of a valve member or other external load through a suitable drive linkage, not shown.

The rotor assembly 2 including the rotor casing 10 is surrounded by the stator assembly 3 which in turn may be contained within an exterior housing 17 having a mounting flange 18 at one end for use in attaching the motor to a valve housing or other support structure as by means of mounting bolts or the like.

The motor of the present invention includes a unique stator assembly 3 which provides for increased output torque efficiency, improved producibility, and increased reliability. The stator assembly includes a stator coil 20 and a pair of axially extending circumferentially spaced stator magnetic poles or pole blades 22, 23 about which the stator coil circumferentially extends with the axis of the stator coil being generally parallel to the rotor axis. Preferably, there are no laminations in the stator assembly about which the stator coil is wound. Instead, the stator coil is desirably a high density layer wound stator coil which not only increases the copper wire fill (turns per volume) by not having to thread the wires back and forth through the conventional stator lamination slots, but also eliminates the ineffective stator coil end turns of a conventional stator coil.

The stator magnetic pole blades 22, 23 are made of a suitable magnetic mateial such as soft iron, and the stator coil 20 desirably extends around the stator magnetic pole blades over substantially the entire length of the stator magnetic pole blades. At opposite ends 26, 27 of the stator magnetic pole blades 22, 23 there is provided a magnetic pole flange or end portion 28, 29 which is desirably made of the same magnetic material as the stator magnetic pole blades and extends radially outwardly therefrom. A stator magnetic pole flange is provided at one end only of each of the stator magnetic poles, with the stator magnetic pole flange 28 being at the end 26 of the stator magnetic pole 22 and the stator magnetic pole flange 29 being at the opposite end 27 of the stator magnetic pole 23. With such a stator magnetic pole construction, when the stator coil is excited by a direct or pulse width modulated current applied thereto, the stator magnetic pole flanges will cause a cross or transverse flux through the stator and rotor assemblies as schematically shown in FIG. 1a which produces a turning torque in the motor.

In the embodiment shown in FIGS. 1, 1a and 2, a magnetic housing 24 made of a suitable magnetic material such as soft iron desirably surrounds the stator coil 20, and the stator magnetic pole flanges, which are desirably integral with the stator magnetic poles, extend radially outwardly into contact with the overlapping inner surface of the outer magnetic housing. The outer magnetic housing provides a magnetic return path for the magnetic field when the stator coil 20 is excited, which magnetic return path may be partially interrupted as by providing one or more air gaps 34 in the outer magnetic housing.

To complete the stator assembly, end plates 32, 33 made of a substantially non-magnetic material such as non-magnetic aluminum may be provided at the end of each stator magnetic pole opposite the respective stator magnetic pole flanges. Such end plates desirably overlap the adjacent ends of the stator magnetic poles and extend radially outwardly to the overlapping inner surface of the outer magnetic housing. Moreover, such end plates desirably extend annularly beyond the opposite sides of the respective stator magnetic poles and terminate adjacent the opposite sides of the other stator magnetic poles and their associated stator magnetic pole flanges. Surrounding the outer magnetic housing 24 is the stator housing 17 which may be made of a substantially non-magnetic material such as non-magnetic aluminum.

The stator magnetic poles 22, 23 are supported by a suitable coil support sleeve which may for example comprise the rotor casing 10. Preferably, such rotor casing is made of a material having high electrical conductivity such as beryllium copper which produces significant eddy current damping for system dynamic requirements and is also sufficiently strong to withstand the internal fluid pressure. Additional support for the rotor casing may be provided by the surrounding stator assembly 3 thus reducing the strength requirements of the rotor casing necessary to contain the internal fluid pressure.

Since the coil windings 20 are in the stator assembly 3, the rotor magnet flux gap between the stator and rotor assemblies must be relatively large in order to accommodate both the flux path clearance 35 between the rotor assembly 2 and rotor casing 10 and the thickness of the rotor casing and protective cover 6 surrounding the rotor magnets 5.

As long as there are one or more air gaps 34 in the outer magnetic housing 24, the magnetic flux produced by the permanent rotor magnets 5 will generally follow the paths schematically shown in FIG. 3 running from the magnet north pole N in opposite directions through the stator magnetic poles 22, 23 and back to the magnet south pole S. This magnetic flux develops a magnetic reluctance torque that tends to center the rotor north and south poles about the X axis extending substantially centrally between the opposed opposite sides of the stator magnetic poles. As the rotor shaft 4 is rotated by an external force, the magnetic reluctance torque develops a restoring torque which varies in magnitude with rotation and acts in opposition to the applied external force tending to return the rotor north and south poles to the original centered position as graphically illustrated in FIG. 6. Such magnetic reluctance torque produced by the magnet fluxes may be used to provide a centering function for the rotor shaft tending to return the rotor shaft to the position $\theta = 0°$ shown in FIG. 3 whenever the current to the stator coil 20 is interrupted.

Figure 6:
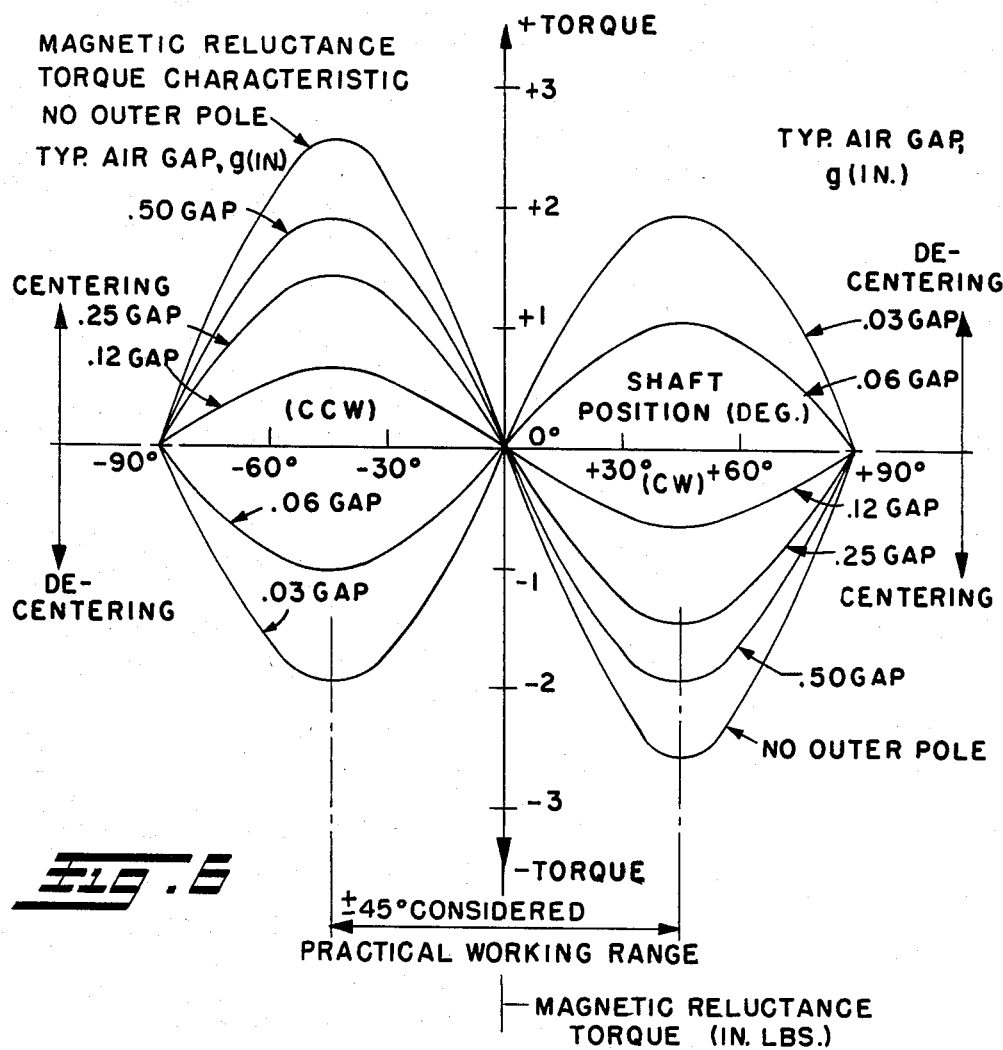
FIG. 6 is a graphic representation schematically showing how the intensity of the magnetic reluctance torque may be varied by varying the length of the air gap between a two piece outer magnetic housing or between a housing structure and stator magnetic poles to obtain a particular magnetic centering or de-centering spring rate at a particular torque or power level.

As FIG. 6 clearly shows, the intensity of the magnetic restoring torque may be varied to obtain a particular magnetic centering spring rate at a particular torque or power level by varying the length of the air gap 34 in the outer magnetic housing 24. As the length of the air gap increases, for example, from about 0.12" up to about 0.5", or when the outer magnetic housing is eliminated altogether (e.g. no outer pole), the magnetic restoring torque increases. However, as FIG. 6 also graphically shows, for smaller air gap lengths, for example in the range of 0.06" or less, the magnetic reluctance torque, rather than providing a centering function, will be de-centering in nature, tending to cause the rotor magnets to seek the position shown in FIG. 5 which is −90° from that shown in FIG. 3. This is due to the fact that as the length of the outer pole gap 34 is reduced or eliminated altogether as shown in FIG. 5, the orientation of the rotor magnets 5′ −90° from the X axis describes a flux path from the magnet north pole N through the respective stator magnetic poles 22′, 23′ and opposite end flanges (of which only the end flange 28′ is shown in FIG. 5) and continuous outer magnetic housing 38 which is of lesser reluctance than the flux path shown in FIG. 3. In this case, as the length of the air gap decreases, for example, from 0.06", the intensity of the magnetic de-centering torque increases as graphically illustrated in FIG. 6, which may also be effectively utilized to provide a desired de-centering magnetic spring rate at a particular torque or power level.

An alternative method of providing an air gap is shown in FIG. 4. Here the outer magnetic housing 40 is completely cylindrical as in the FIG. 5 embodiment. However, in this instance an air gap 41 is provided between one or both of the stator magnetic pole end flanges 42 and the outer cylindrical magnetic housing 40, thus once again describing a flux path of lesser reluctance through the stator magnetic poles 43, 44 similar to the motor design of FIG. 3 rather than through the outer magnetic housing 40. Otherwise, the details of construction and operation of the motor shown in FIG. 4 (and also in FIG. 5) are substantially the same as that shown in FIGS. 1–3, and the same reference numerals followed by a prime symbol (′) are used to designate like parts.

Figure 7:
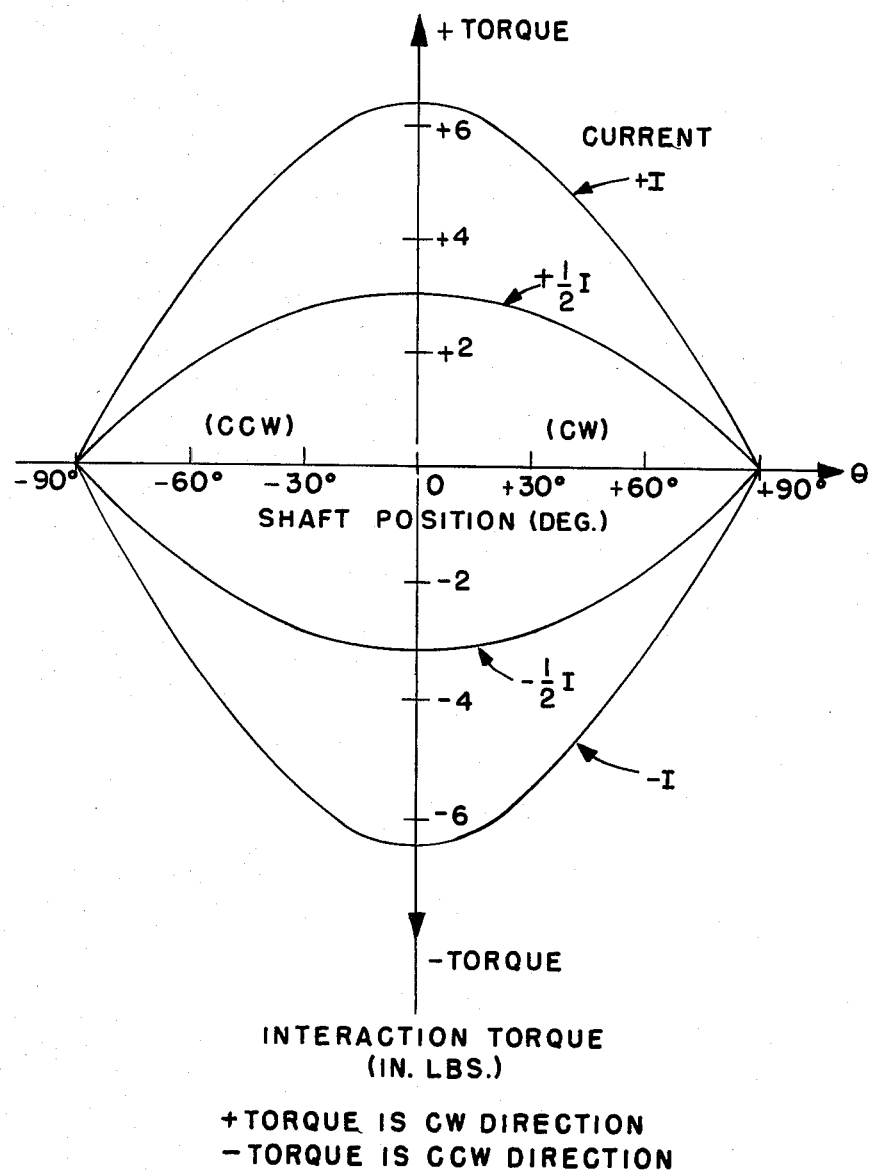
FIG. 7 is a graphic representation schematically showing the interaction of magnetic fields (electro-magnetic) torque versus angular shaft position profile resulting from the magnetic field that is developed when the stator coil for the motor design types of the present invention are excited using various current levels and direction which interacts with the magnetic field produced by the permanent rotor magnets.

In addition to the magnetic reluctance torque developed by the rotor magnets, an electro-magnetic torque is developed when the electromagnetic stator coil 20 is excited as schematically shown in FIG. 1a. FIG. 7 graphically illustrates the general torque versus angular shaft position profile for various current levels and directions for the motor design types shown in FIGS. 2 through 5. As shown, the magnetic field torque is proportional to the amount of direct or pulse width modulated current passing through the stator coil. Also, when a positive current is applied, a positive torque tending to rotate the rotor shaft in a clockwise direction is produced over a relatively large excursion of the rotor shaft which varies, for example, from a maximum torque output at the null or centered position of the rotor shaft ($\theta = 0°$) to approximately 50% of the maximum torque output at ±60° of rotation of the rotor shaft from such centered or null position. Conversely, when a negative current is applied, a negative torque tending to rotate the rotor shaft in a counterclockwise direction is produced over the same excursion of the rotor shaft.

Figure 8:
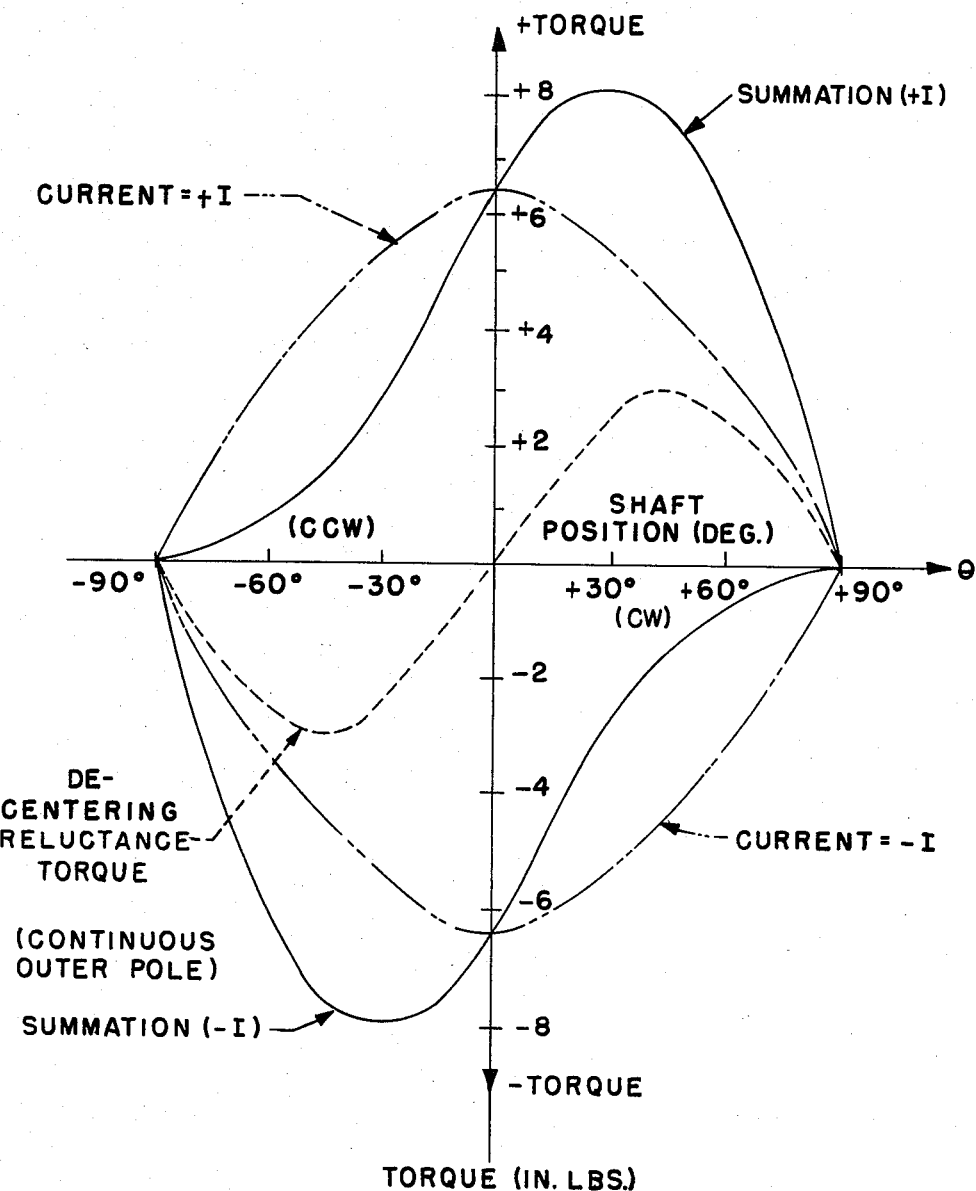
FIG. 8 is a graphic representation of the net torque summation of the electro-magnetic torque developed by applying a positive and negative current to the stator coil and the magnetic reluctance de-centering torque produced by the permanent rotor magnets of a motor design of the type illustrated in FIG. 5.

The interaction of magnetic fields (electro-magnetic) torque developed by applying current to the stator coil 20 combines with the magnetic reluctance torque produced by the rotor magnets 5 to provide a net torque output for the motor at various angular shaft positions which will vary depending on the magnetic reluctance torque profile for a given motor stator design. FIG. 8, for example, shows the net torque summation when a positive and negative current ±I is applied to the electro-magnetic coil 20′ of a motor having a continuous outer magnetic housing 38 without any air gaps in the outer pole or between the outer and inner magnetic poles as in the FIG. 5 embodiment.

Figure 9:
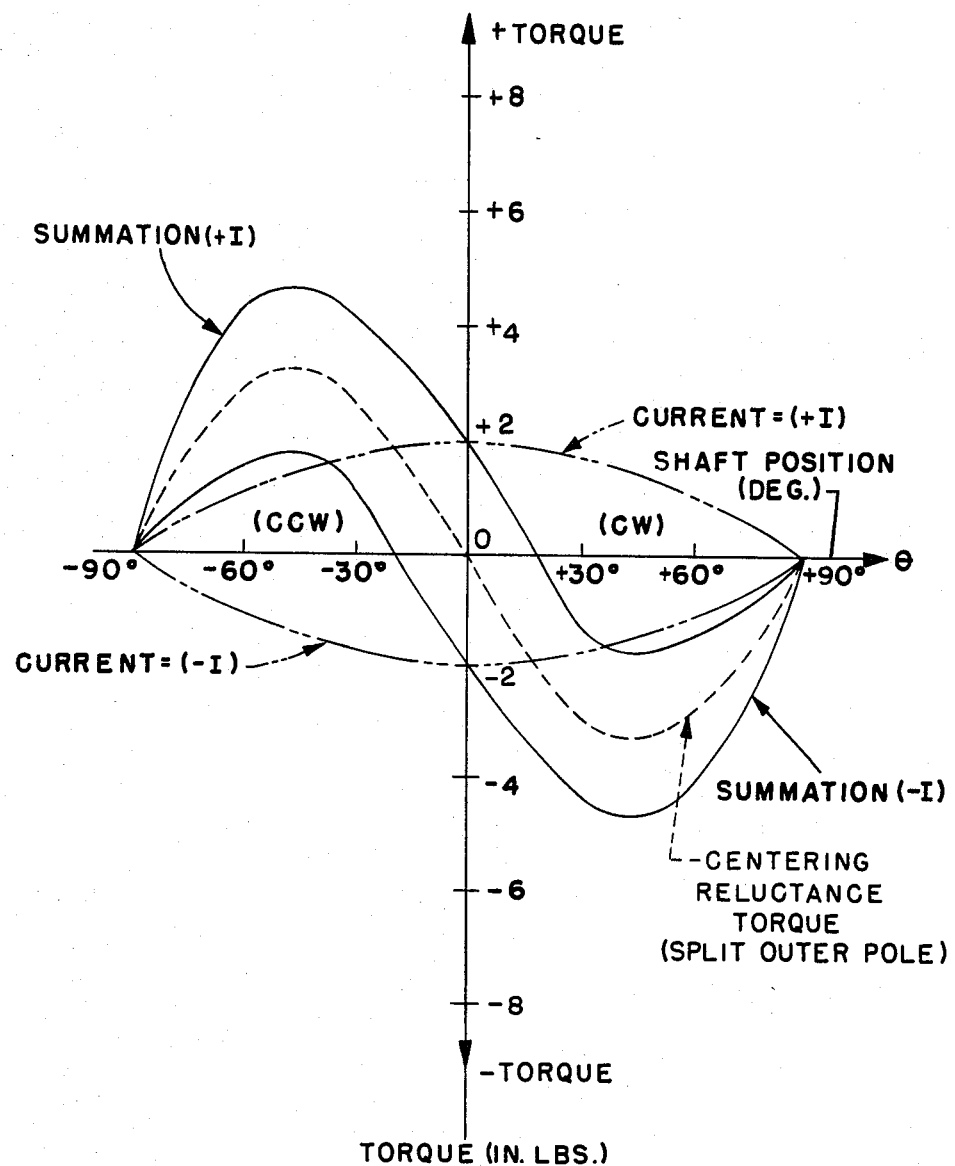
FIG. 9 is a graphic representation of the net torque summation of the electro-magnetic torque developed by applying a positive and negative current to the stator coil and the magnetic reluctance centering torque produced by the rotor magnets of a motor design of the type depicted in FIGS. 3 and 4.

FIG. 9, on the other hand, shows the net torque summation resulting from the application of a positive and negative current ±I to a motor having an air gap 34 or 41 in the outer magnetic housing or between the outer magnetic housing and stator magnetic poles as in the FIGS. 3 and 4 embodiments.

As will be apparent, the electro-magnetic torque at a given applied current level is much greater for a motor having a de-centering capability with a continuous outer magnetic housing than one having a centering capability with an air gap in the outer magnetic housing. Likewise, the net torque output tending to rotate the rotor shaft in a positive or negative direction with positive or negative applied current, respectively, is much greater for a motor having a de-centering capability than one having a centering capability. However, a motor having a centering capability not only has the advantage of providing for automatic return of the rotor shaft to the null or centered position upon de-energization of the stator coil, but the total net torque output is at its maximum at the 0° or null position of the rotor shaft and is proportionately less as the motor shaft moves away from the null position. A motor having a de-centering capability, on the other hand, has a zero total net torque output at its de-centered position, whereby a mechanical stop would have to be provided preventing movement of the rotor shaft all the way to the fully de-centered position when the current to the stator coil is interrupted.

Of course, in the case of a motor design having a centering capability, sufficient direct or pulse width modulated current must be applied to the stator coil to produce an electro-magnetic torque which is sufficiently greater than that consumed in overcoming the magnetic reluctance torque to obtain the desired useful work output over the required angle of rotation of the rotor shaft. In the example shown in FIG. 9, the rotor shaft has a maximum travel of approximately ±20° when a current ±I is applied to the stator coil.

Figure 10:
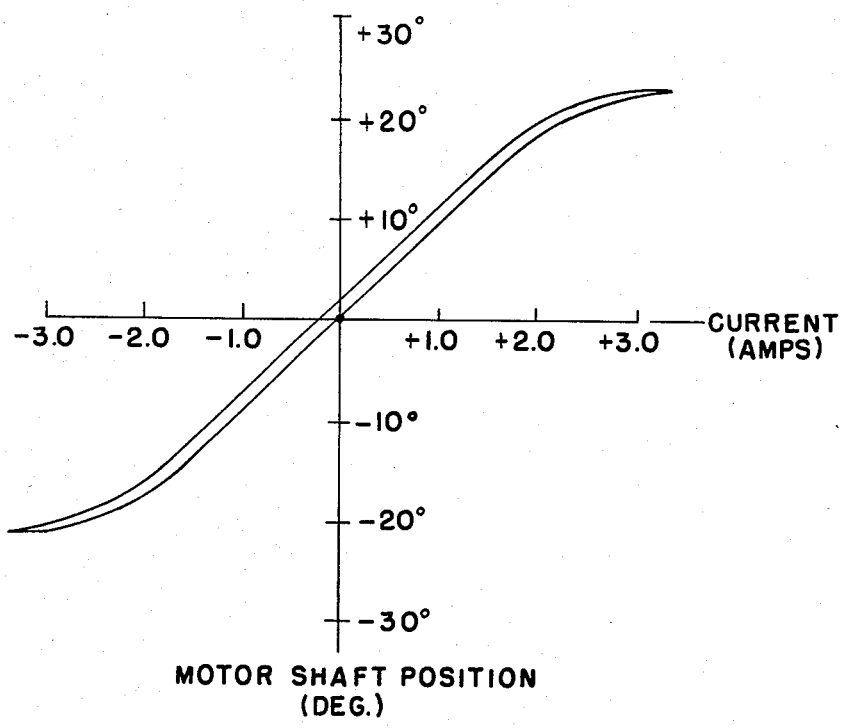
FIG. 10 is a graphic illustration showing the motor shaft position for different levels of applied direct or pulse width modulated current for a representative motor constructed in accordance with this invention which can be effectively utilized to provide a magnetic stop for the rotor shaft at the end of the rotational design stroke of the motor.

A motor constructed in accordance with the present invention has the further advantage that as the direct or pulse width modulated current ±I is increased through the stator coil and associated flux density is built up within the magnetic stator structure, a level will be reached at which the material of the magnetic stator structure becomes magnetically saturated at one or more points. FIG. 10 shows the motor shaft position for different levels of applied current for a representative motor constructed in accordance with this invention. As the graph of FIG. 10 clearly illustrates, this saturation point is a rather sharply defined knee, and may be used as a magnetic stop to establish the maximum rotational stroke of the motor shaft for a given stator design. In the case of the motor design illustrated in FIG. 10, the rotor shaft cannot be rotated much beyond ±22° regardless of how much more current ±I is applied, thus providing a magnetic stop for the motor shaft at that point for the particular stator configuration shown. The current level at which the magnetic stator structure becomes magnetically saturated at some point in the flux path can be varied as by modulating the thickness of the stator magnetic pole end flanges 28, 29; i.e., by cutting away a portion of the end flanges to provide a relatively thin section at one or more points at which the magnetic stator structure will become magnetically saturated.

Figure 11:
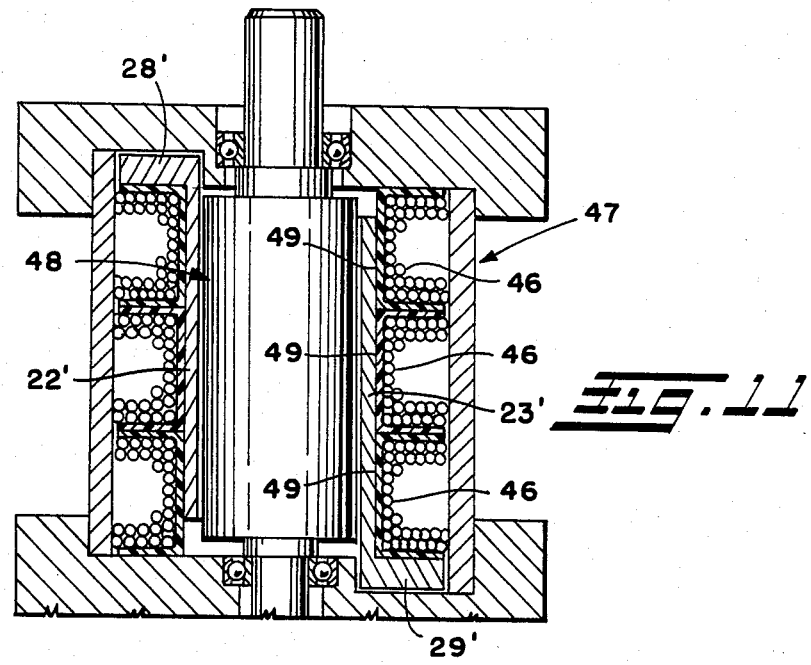
FIG. 11 is a fragmentary transverse section through still another form of limited angle torque motor in accordance with this invention including multiple coil windings in the stator assembly to provide for electrical redundancy without altering the maximum rotational stroke of the rotor shaft.

Another feature of the motor design of the present invention is that multiple coil windings 46 can be utilized in the stator assembly 47 as schematically shown in FIG. 11 to provide electrical redundancy without altering the maximum rotational stroke of the motor. The magnetic stop for a particular stator configuration will remain at the same rotational point of the rotor assembly 48 regardless of the number of current carrying coils, since the torque producing flux of the multiple coil structure results from a summation of the ampere turn contributions of the individual windings. If, for example, torque saturation occurs at X ampere turns total, it will occur at the same torque point regardless of whether the X ampere turns total exists in one or in a plurality of such coils.

The individual coils 46 may be wound on plastic bobbins 49 to enhance their producibility and provide isolation between the windings of adjacent coils. Also, any number of such coils may be inserted over the stator magnetic poles 22', 23' depending on the desired amount of electrical redundancy. In the embodiment shown in FIG. 11, there are three such coils 46 for providing three channel electrical redundancy. If one coil or its associated electronics should fail, its counterpart channels will maintain control by equalizing the failed channel force effect. The ability to sense which channel has failed may be provided for in the failure monitoring electronics such that when detected, the failed channel is decoupled and made passive.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

We claim:

1. A limited angle torque motor comprising a rotor assembly and a stator assembly surrounding said rotor assembly, said rotor assembly and stator assembly being mounted for relative rotation, said rotor assembly including a permanent rotor magnet magnetized in the diametrical direction, and said stator assembly including a pair of circumferentially spaced axially extending stator magnetic poles having magnetic flanges at opposite ends thereof, a stator coil extending circumferentially around said stator magnetic poles, an outer magnetic housing surrounding said stator coil, said magnetic flanges extending radially outwardly toward said outer magnetic housing, said stator coil when energized by direct or pulse width modulated current providing a cross flux between said stator assembly and rotor magnet which causes said rotor shaft to rotate through a limited rotational angle range, and air gap means in the flux path between said outer magnetic housing and said stator magnetic poles which causes the magnetic flux produced by said permanent rotor magnet to follow a path from said permanent rotor magnet through said stator magnetic poles that produces a magnetic reluctance torque having a strong tendency to center said rotor shaft at the midpoint of such limited rotational angle range.

2. The motor of claim 1 wherein said air gap means is in said outer magnetic housing.

3. The motor of claim 1 wherein said air gap means is between said outer magnetic housing and one of said magnetic flanges.

4. The motor of claim 1 wherein there is a single magnetic flange on each of said stator magnetic poles, said magnetic flanges being at opposite ends of the respective stator magnetic poles.

5. The motor of claim 4 wherein said magnetic flanges extend radially outwardly to an overlapping inner surface on said outer magnetic housing.

6. The motor of claim 4 wherein said magnetic housing is a closed cylinder surrounding said stator coil, and said magnetic flanges extend radially outwardly to an overlapping inner surface on said outer magnetic housing.

7. The motor of claim 6 wherein said air gap means is between one of said magnetic flanges and said outer magnetic housing.

8. The motor of claim 1 further comprising substantially non-magnetic end plates at the ends of said stator magnetic poles opposite the respective magnetic flanges.

9. The motor of claim 8 wherein said end plates extend beyond the opposite sides of the respective stator magnetic poles into close proximity with the magnetic flange on the other stator magnetic pole.

10. The motor of claim 9 wherein said end plates extend radially outwardly to said outer magnetic housing.

11. The motor of claim 1 wherein said permanent rotor magnet produces a magnetic reluctance torque tending to maintain said rotor shaft at the midpoint of such limited rotational angle range, and said stator coil produces an electro-magnetic torque when a direct or pulse width modulated current is applied thereto which is greater than the magnetic reluctance torque produced by said permanent rotor magnet to cause said rotor shaft to move through such limited rotational angle range.

12. The motor of claim 1 wherein the flux path between said outer magnetic housing and said stator magnetic poles has one or more points at which said flux path becomes magnetically saturated when the current through said stator coil reaches a predetermined level which produces a magnetic stop preventing rotation of said rotor shaft beyond a predetermined rotational angle.

13. The motor of claim 12 further comprising means for varying the current level at which said flux path becomes magnetically saturated.

14. The motor of claim 13 wherein the current level at which said flux path becomes magnetically saturated is varied by modulating the thickness of said magnetic flanges at one or more points.

15. The motor of claim 1 wherein said stator coil comprises a high density layer wound coil extending circumferentially around said stator magnetic poles over substantially the entire length thereof.

16. The motor of claim 1 wherein said stator coil comprises a plurality of high density layer wound stator coils axially disposed along the length of said stator magnetic poles.

17. The motor of claim 16 wherein each of said stator coils is wound on a plastic bobbin to enhance its producibility and provide isolation between the windings of adjacent coils.

18. The motor of claim 16 wherein said flux path in said stator assembly has one or more points at which said flux path becomes magnetically saturated when the direct or pulse width modulated current through said stator coils reaches a predetermined level which produces a magnetic stop preventing rotation of said rotor shaft beyond a predetermined rotational angle.

19. The motor of claim 1 wherein said rotor assembly further comprises a one-piece rotor shaft having a transverse slot therein for receipt of said permanent rotor magnet to provide a maximum magnet cross section having a firm support structure.

20. The motor of claim 19 further comprising a protective cover which is slipped over said rotor shaft and magnet contained therein after said assembly has been ground into a solid cylindrical shape to prevent potential rotor magnet breakage contamination.

21. A limited angle torque motor comprising a rotor assembly and stator assembly, said rotor assembly including a rotor shaft mounted for rotation relative to said stator assembly and a permanent magnet mounted for rotation with said rotor shaft, said permanent magnet being diametrically oriented, and said stator assembly including a stator coil and magnetic stator structure means for creating a cross flux through said magnetic stator structure means and permanent magnet producing a limited rotational angle range for said rotor shaft when a direct or pulse width modulated current is applied to said coil, said magnetic stator structure means having one or more points at which said magnetic stator structure means becomes magnetically saturated when the current through said stator coil reaches a predetermined level which produces a magnetic stop preventing rotation of said rotor shaft beyond a predetermined rotational angle.

22. The motor of claim 21 further comprising means for varying the current level at which said magnetic stator structure means becomes magnetically saturated.

23. The motor of claim 21 wherein said magnetic stator structure means includes a pair of oppositely disposed stator magnetic poles about which said stator coil circumferentially extends, and an outer magnetic housing surrounding said stator coil, said stator magnetic poles having magnetic flanges at opposite ends thereof which extend radially outwardly toward said outer magnetic housing, and the current level at which said magnetic stator structure means becomes magnetically saturated is varied by modulating the thickness of one of said magnetic flanges.

24. The motor of claim 21 wherein said magnetic stator structure means includes a pair of oppositely disposed stator magnetic poles about which said stator coil extends, an outer magnetic housing surrounding said stator coil, and magnetic flanges at opposite ends of said stator magnetic poles extending radially outwardly toward said outer magnetic housing, said magnetic housing and one of said stator magnetic poles having an air gap therebetween, whereby the magnetic flux produced by said permanent rotor magnet follows a path from said permanent rotor magnet through said stator magnetic poles producing a magnetic reluctance torque for returning said rotor shaft to a centered or null position when the current to said stator coil is interrupted.

25. The motor of claim 21 wherein said magnetic stator structure means includes a pair of stator magnetic poles having magnetic flanges at opposite ends thereof and an outer magnetic housing which defines a flux path for the magnetic flux produced by said permanent rotor magnet that develops a magnetic reluctance torque for urging said rotor shaft toward a de-centered position 90° from the normal centered or null position of said rotor shaft.

26. A limited angle torque motor comprising a rotor assembly and stator assembly, said rotor assembly including a rotor shaft mounted for rotation relative to said stator assembly and a permanent magnet mounted for rotation with said rotor shaft, said permanent magnet being diametrically oriented, said stator assembly including a pair of circumferentially spaced axially extending stator magnetic poles having magnetic flanges at opposite ends thereof, a stator coil extending circumferentially around said stator magnetic poles, an outer magnetic housing surrounding said stator coil, said magnetic flanges extending radially outwardly toward said outer magnetic housing, said stator coil when energized by direct or pulse width modulated current producing an electro-magnetic torque which causes said rotor shaft to rotate through a limited rotational angle range, and said permanent rotor magnet producing a magnetic reluctance torque tending to move said rotor shaft toward a de-centered position 90° from the midpoint of such limited rotational angle range.

27. The motor of claim 26 wherein said magnetic housing comprises a closed cylinder surrounding said stator coil, and said magnetic flanges extend radially outwardly to an overlapping inner surface on said outer magnetic housing.

28. The motor of claim 27 further comprising substantially non-magnetic end plates at the ends of said stator magnetic poles opposite the respective magnetic flanges.

29. The motor of claim 28 wherein said end plates extend beyond the opposite sides of the respective stator magnetic poles into close proximity with the magnetic flange on the other stator magnetic pole.

30. The motor of claim 29 wherein said end plates extend radially outwardly to said outer magnetic housing.

* * * * *